E. J. LEWIS.
FRUIT CORING, SIZING, AND SLICING MACHINE.
APPLICATION FILED NOV. 7, 1921.
1,415,458.
Patented May 9, 1922.
5 SHEETS—SHEET 1.
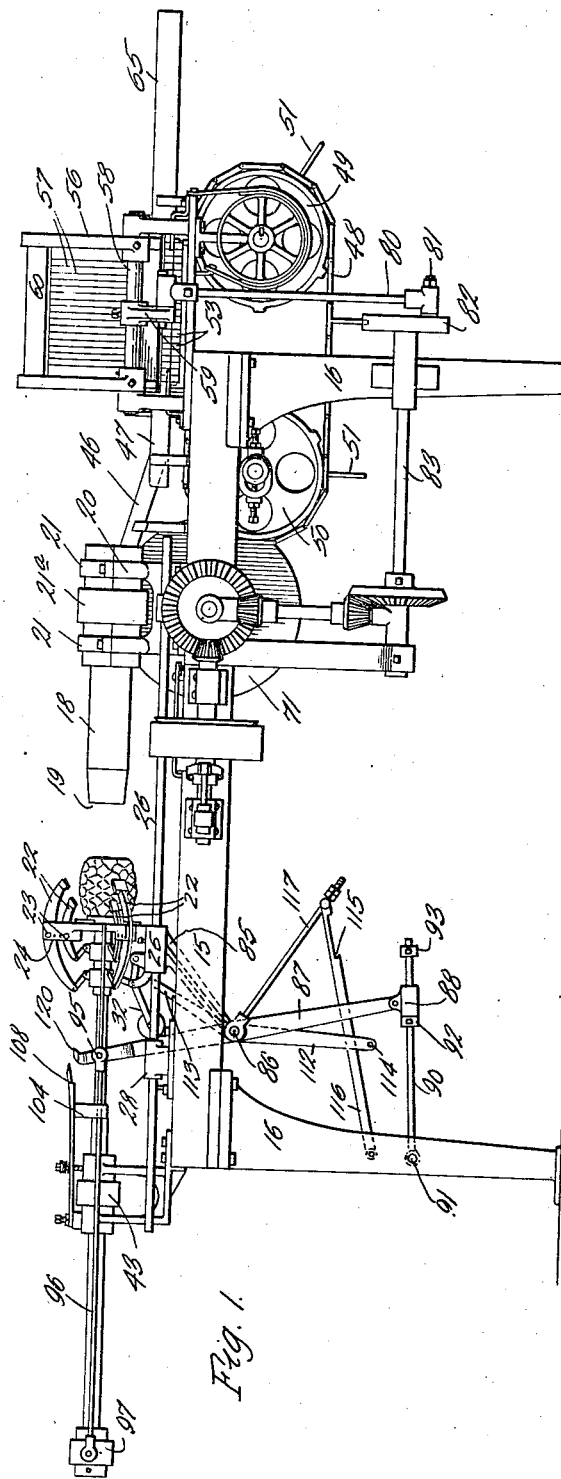
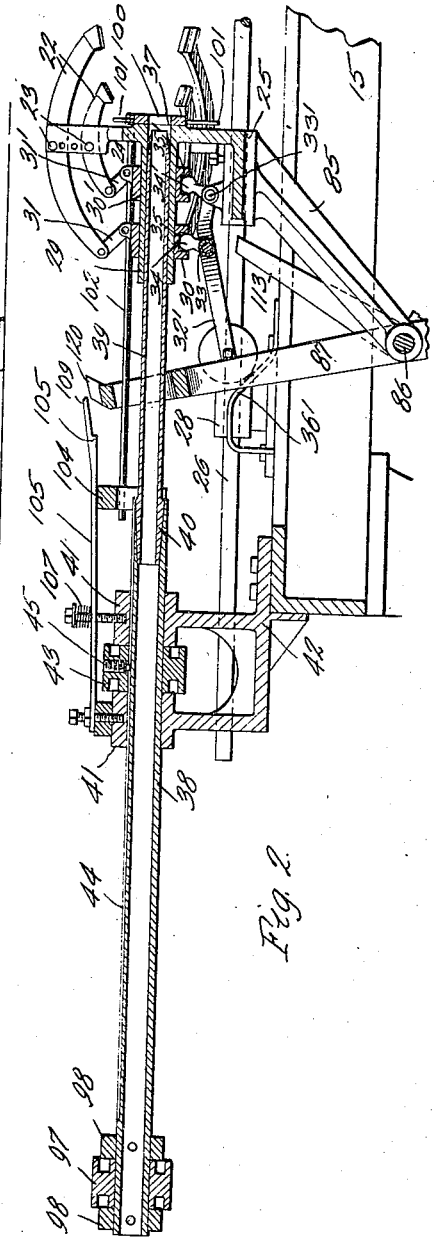
INVENTOR
Elgie J. Lewis
by Parker & Rockwood
ATTORNEYS.

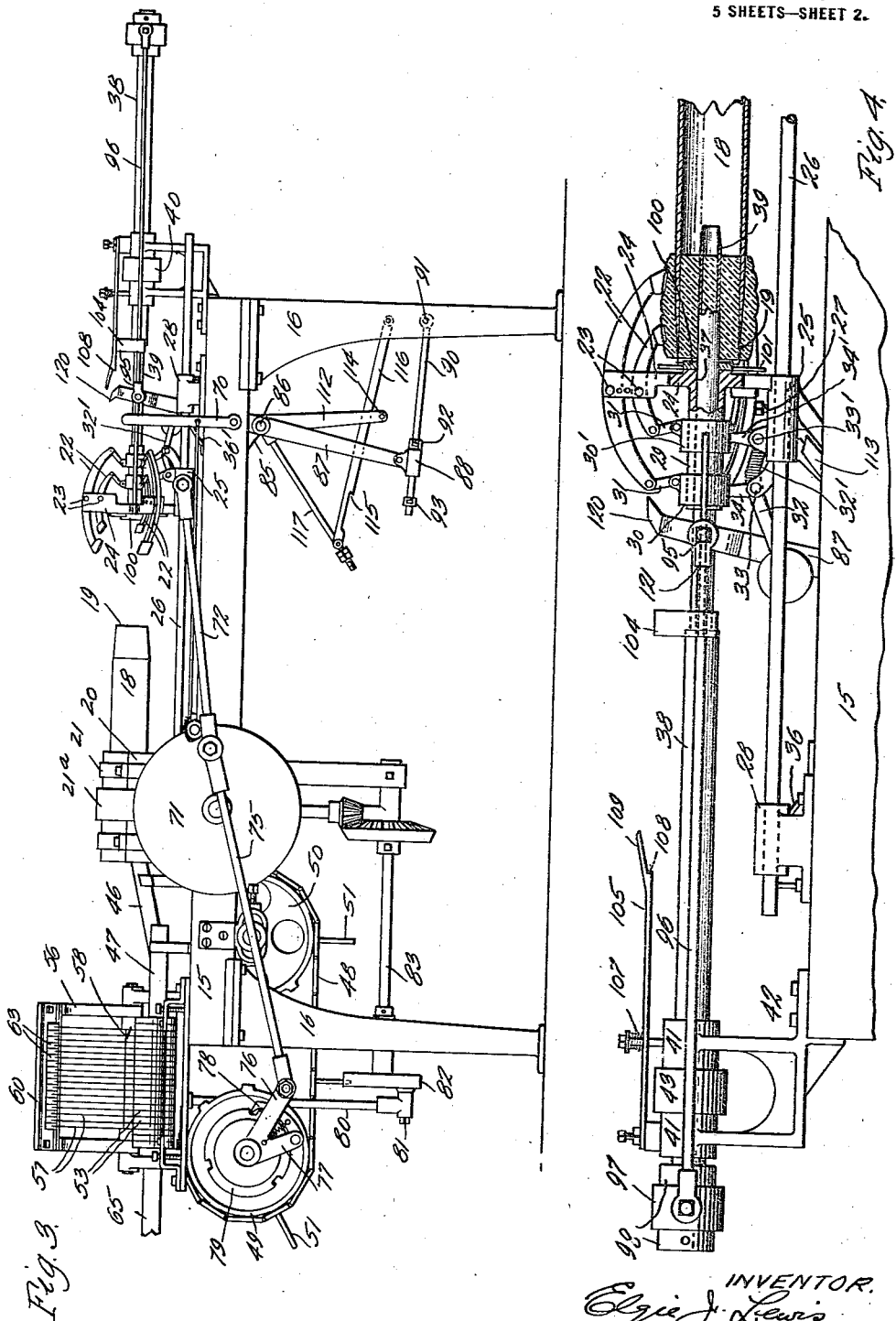

E. J. LEWIS.
FRUIT CORING, SIZING, AND SLICING MACHINE.
APPLICATION FILED NOV. 7, 1921.
1,415,458.
Patented May 9, 1922.
5 SHEETS—SHEET 3.
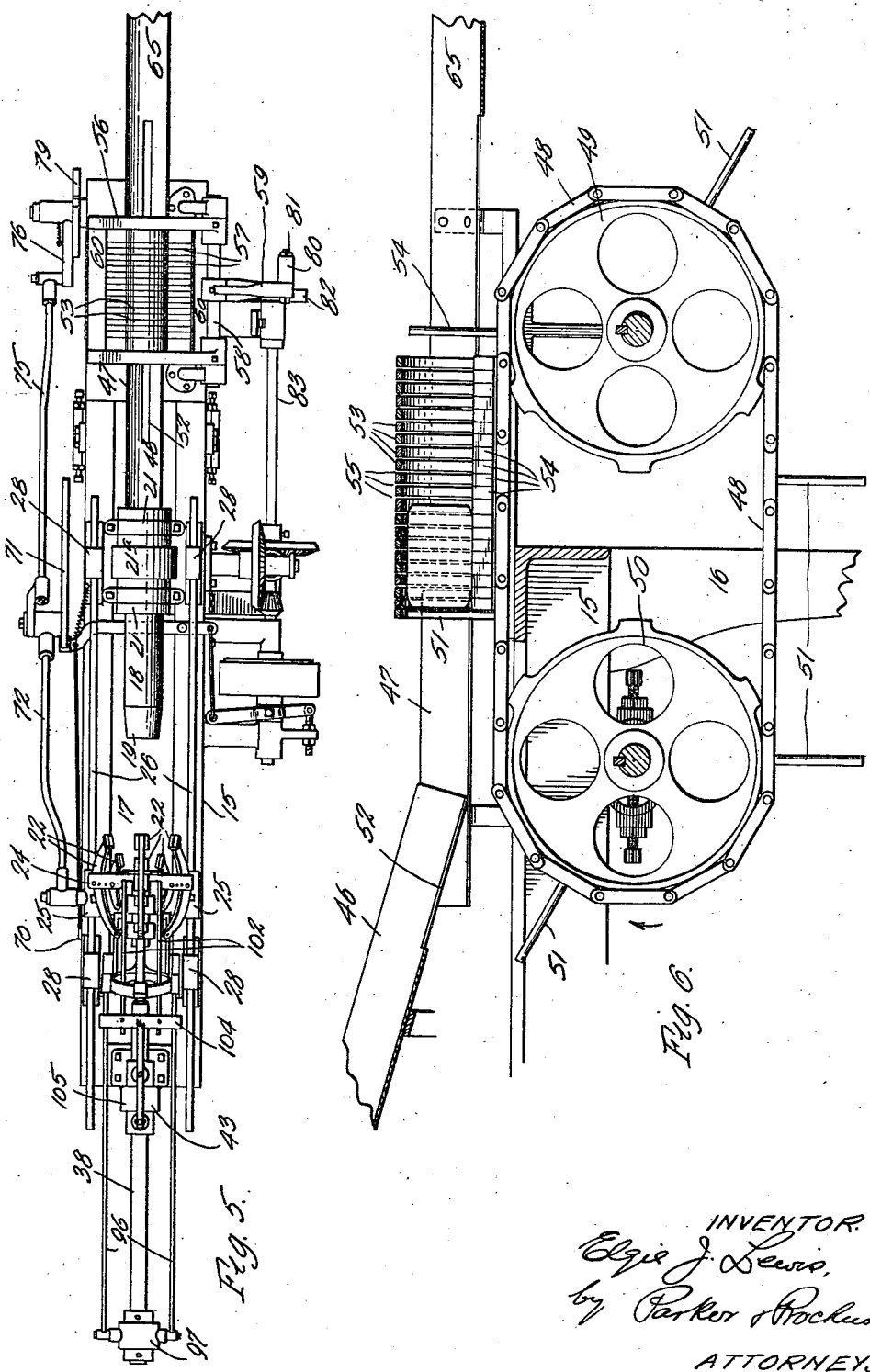
INVENTOR.
Elgie J. Lewis,
by Parker & Brockow.
ATTORNEYS.

E. J. LEWIS.
FRUIT CORING, SIZING, AND SLICING MACHINE.
APPLICATION FILED NOV. 7, 1921.

1,415,458.

Patented May 9, 1922.
5 SHEETS—SHEET 4.

INVENTOR
Elgie J. Lewis
by Parker Prochnow
ATTORNEYS.

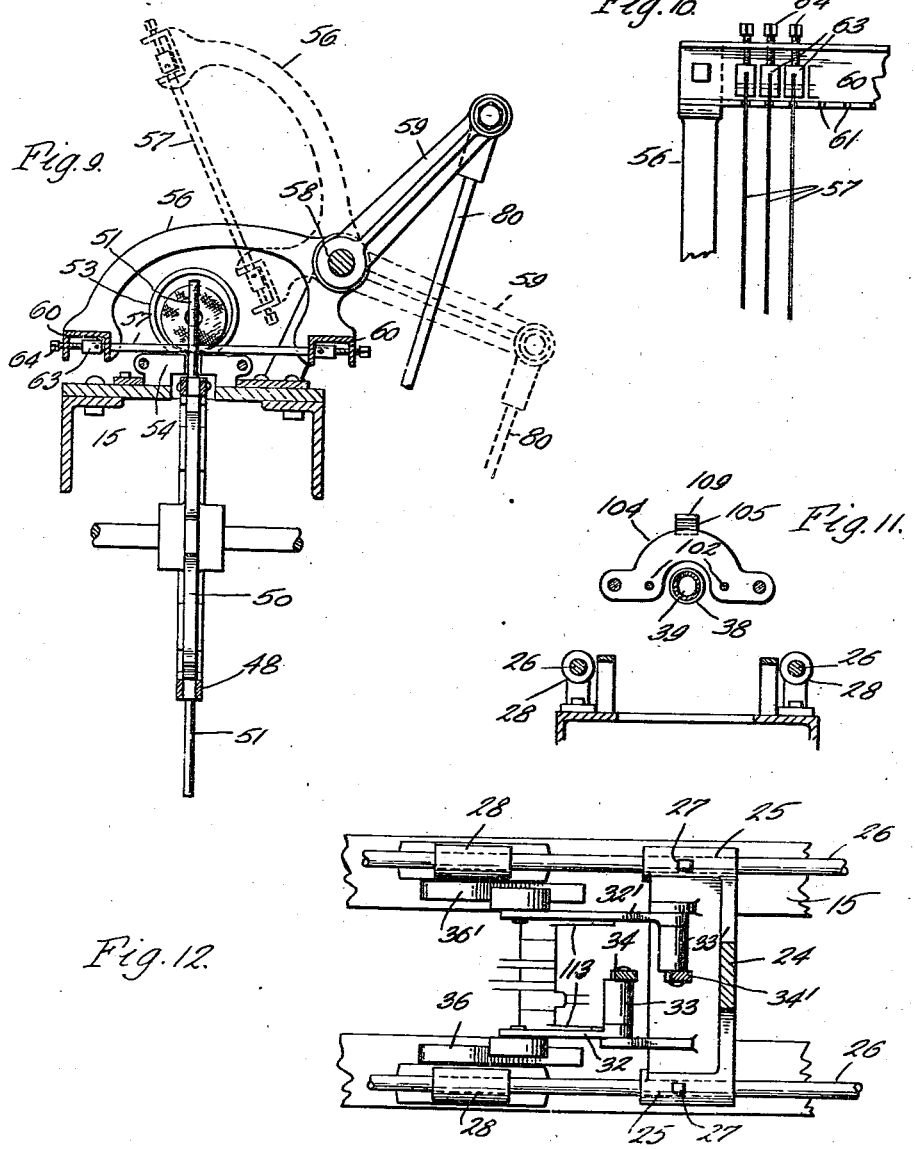

UNITED STATES PATENT OFFICE.

ELGIE J. LEWIS, OF MIDDLEPORT, NEW YORK.

FRUIT CORING, SIZING, AND SLICING MACHINE.

1,415,458. Specification of Letters Patent. Patented May 9, 1922.

Application filed November 7, 1921. Serial No. 513,270.

*To all whom it may concern:*

Be it known that I, ELGIE J. LEWIS, a citizen of the United States, residing at Middleport, in the county of Niagara and State of New York, have invented a new and useful Improvement in Fruit Coring, Sizing, and Slicing Machines, of which the following is a specification.

This invention relates to fruit coring, sizing and slicing machines of the type particularly adapted to be used on pine-apples and like fruits.

The objects of the invention are to provide a machine of this type which is capable of simultaneously coring and sizing the fruit; also to provide a machine of this kind in which the operations of coring, sizing, slicing and removing the skin from the machine are effected during a single cycle of operation of the machine; also to provide a machine of this kind with slicing means of improved construction; also to provide a machine of this kind having improved means for centering and holding a fruit to be cored; also to provide improvements in skin tripping devices for machines of this type; also to improve the construction of machines of this kind in the other respects hereinafter described and claimed.

In the accompanying drawings:

Fig. 1 is a side elevation of a fruit coring, sizing and slicing machine embodying the invention.

Fig. 2 is a longitudinal sectional elevation thereof on an enlarged scale, showing the gripping and coring mechanism.

Fig. 3 is a side elevation of the machine.

Fig. 4 is a fragmentary side elevation, partly in section, of the portion of the machine shown in Fig. 2, showing the parts in different positions.

Fig. 5 is a top plan view of the machine.

Fig. 6 is a longitudinal sectional elevation on an enlarged scale, showing the conveying and slicing mechanism.

Fig. 9 is a transverse sectional elevation on an enlarged scale of the slicing mechanism.

Fig. 10 is a fragmentary elevation of a portion of the slicing mechanism thereof, showing the means for securing the slicing knives.

Fig. 11 is a transverse section on line 11, Fig. 7.

Fig. 12 is a sectional plan view thereof on line 12—12, Fig. 7.

Figure 7:
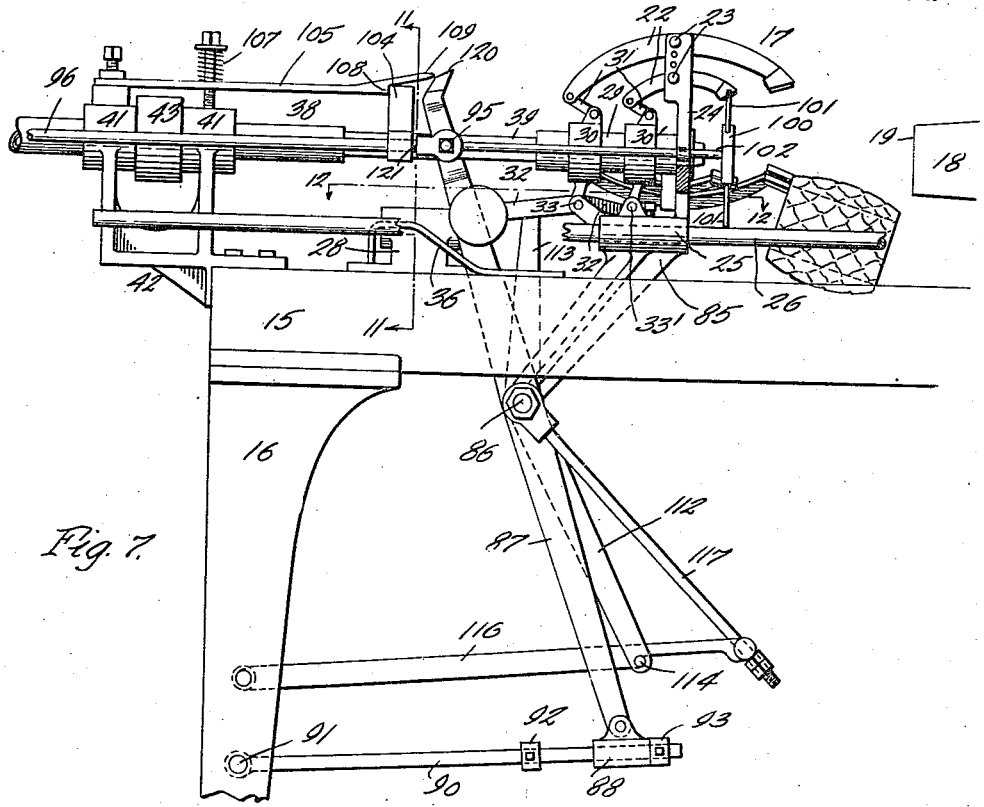
Fig. 7 is a side elevation on an enlarged scale of a portion of the machine.

The preferred embodiment of the invention illustrated comprises generally, a frame or stand on which the operating parts of the machine are mounted, a sizing tube or member, a movable holder for the fruit, and a coring device which is movable with respect to said holder and said sizing tube for removing the core from the fruit, together with means for actuating the respective parts, and a slicing mechanism for slicing the fruit after the same has been cored and sized.

The operating parts of the machine may be mounted on any suitable frame, which in the machine illustrated, includes a platform or table 15 which is supported by a suitable number of legs 16.

17 designates a holding device or head which is adapted to receive the pineapple or other fruit, and which is movably mounted on the table so as to force the fruit over and into a sizing tube or horn 18. This sizing tube, which is preferably of cylindrical shape, and has a sharp, bevelled, forward edge 19, is mounted in any suitable manner on the table. In the embodiment of the invention illustrated, the sizing tube is rotatably mounted in a fixed bearing or rest 20, and is held in place by means of the removable straps or caps 21 and is adapted to be turned or rotated by a pulley 21ª. The sizing tube removes the skin from the pineapple or other fruit as the fruit is forced against the tube and the inner portion of the fruit passes into the sizing tube, as shown in Fig. 4 of the drawings, while the skin or outer portion of the fruit surrounds the outer surface of the sizing tube adjacent its end. Any other means for cutting a cylindrical part from the inner portion of the fruit may be used if desired.

The holder for the fruit, which is preferably mounted to move upon the table toward and from the sizing tube to cause the middle portion of a fruit to be cut out, comprises a plurality of pivoted fingers 22. As illustrated in the drawings, these fingers are preferably arranged in pairs, one of the fingers of each pair being shorter than the other so that the two fingers of each pair grasp the fruit at two different places, there being preferably three pairs of fingers provided for each holder. The fingers 22 are pivoted as at 23 to a spider 24 which is preferably provided with a pair of apertured sleeves or lugs 25 which receive a pair of rods 26 or the like. The lugs 25 are secured to the rods 26 by suitable means, such as set screws 27, and the rods are mounted to slide backward and forward on the table in bearings 28 which are secured to the table top. Other suitable means may be provided, if desired, for mounting the spider 24 so that it will move toward and from the sizing tube. The spider 24 has an axially arranged tubular part or hub 29, and 30 and 30′ designate finger actuating collars slidably mounted on the hub 29, and which are connected by links 31 or other suitable means to the rear ends of fingers 22, whereby when the collars are moved forwardly or to the right in Figs. 1, 2 and 4, the gripping ends of the fingers will open and when the collars are moved rearwardly, or to the left, in Figs. 1, 2 and 4, the fingers will close. These finger-actuating collars are controlled in such a manner that when the holder is moved forward to impale the fruit upon the sizing tube, the fingers will be closed upon the fruit placed in the holder and will grip the outer covering or skin of the fruit, and will maintain its grasp upon such outer covering or skin until the holder approaches its rearward or starting position, whereupon the fingers will be opened to permit the skin or outer covering of the fruit to be discharged from the holder. In the embodiment of the invention illustrated, the means provided for achieving this purpose comprise a pair of weighted levers 32 and 32′ which are pivoted as at 33 and 33′ to the spider 24, the levers having projecting parts, such as lugs 34, 34′, which engage in suitable recesses 35, 35′, in the collars 30 30′, for moving those collars to open and close the fingers when the weighted lever is raised or lowered. The levers 32 and 32′ may be raised or lowered independently of each other in any desired manner, cams 36 and 36′ which are mounted on the table top being shown for this purpose. By means of this construction the larger and smaller fingers can be actuated independently of each other, so that the holding device can readily adapt itself to fruit of different sizes and shapes.

The spider 24 is preferably provided with an opening 37 to permit the passage through the spider of a coring tube or the like which is adapted to be forced through the fruit as it is impaled upon the sizing tube to remove the core therefrom. The coring device may be of any suitable form, in the preferred embodiment shown, this device comprises a movable holder tube 38 or the like which is adapted to receive the detachable coring tube 39, the coring tube 39 being provided with a bevelled end 40 adapted to fit tightly within the forward end of the holder tube 38. By reason of this construction the coring tube 39 may be removed or replaced if it becomes dull, or different sized coring tubes may be readily inserted. The holder tube 38 is slidably mounted in bearings 41 arranged on a bracket 42 secured to the table. These bearings 41 are preferably spaced apart, and a pulley 43 is mounted on the holder tube 38 between the bearings. As best shown, in Fig. 2, the holder tube 38 is provided with a longitudinal keyway 44, and the pulley 43 carries a set screw or key 45 which extends into the keyway 44, whereby the pulley will drive or turn the holder tube while the tube remains free to slide endwise through the pulley and the bearings. The pulley 43 is adapted to receive the usual driving belt (not shown), whereby the coring tube is rotated so that it may be more readily forced into the fruit to remove the core without bruising or otherwise damaging it. The cores enter the coring tube and are discharged from the machine through the holder tube.

46 designates an inclined discharge apron connected to the sizing tube 18, and which acts to receive the cored and sized fruits after they are forced through the sizing tube, and which guides them to a substantially horizontal guide member 47 leading to the slicing device.

Suitable means are provided for conveying the pared fruits to the slicing device. In the preferred embodiment illustrated, 48 designates an endless, intermittently movable chain, which travels over sprocket wheels 49 and 50, this endless chain being provided with a number of projecting parts or arms 51 which, as the chain travels, project into the discharge apron 46 and guide device 47 through a slot 52 formed therein, and which engage the pared fruits and by intermittent movements carry them forward into the slicing device and permit them to rest therein until they have been sliced. The slicing device may be of any suitable or desired construction, that shown comprising a tunnel or tube-like knife-guiding device into which the cored and sized fruits are passed, and which is provided with a number of guide slits or openings which guide a plurality of blades or other cutting devices as they slice the fruit, and which determine the thickness of the slices or portions into which the fruit is cut. The preferred form of the device illustrated comprises a plurality of spaced rings 53, see Fig. 6, which are provided with relatively thick, bottom portions 54, by means of which the rings may be secured together, the parts of the rings above the enlarged bottom portions forming spaces or slits 55 into which the cutting knives are adapted to pass. The preferred form of cutting knife comprises a frame 56, Figs. 9 and 10, which carries a plurality of blades 57. This frame is journalled to turn about the axis of a shaft or pivot 58 and has a crank arm 59 by means of which the frame may be moved to and from full and dotted line positions indicated in Fig. 9. The knife frame 56 is preferably provided at its opposite ends with a pair of channels 60, the inner sides of which are preferably notched as at 61, Fig. 10, to permit the cutting blades to extend through the notches into the channels. The ends of the cutting blades are secured to suitable end blocks 63 and are held in place in the frame by means of machine screws 64 or other suitable devices which extend through the outer sides of the channels and are threaded into the end blocks 63. This construction permits of the ready removal and replacement of the blades and also facilitates the tensioning or tightening of the blades as desired. By arranging the pivot 58 of the knife frame above the fruit, as shown in Fig. 9, the knives in cutting the fruit are drawn through the fruit while slicing the same, thus producing a superior cutting action. In the operation of this portion of the machine the conveyor places a fruit into the knife guiding device, whereupon the knives descend through the slits therein to effect the slicing of the fruit. The next movement of the conveyor carries the sliced fruit out of the knife guiding device and into a discharge trough 65 and also carries another fruit into the knife guiding device.

The means for producing relative movement between the several parts of the machine to effect the coring, sizing and slicing of the fruit may be of any suitable construction, that shown being operable intermittently so that each part of the machine performs one operation on the fruit. In the construction shown in the drawings, the machine is started by actuating a hand lever 70 whenever a fruit has been placed into the holding member. The hand lever 70 actuates a suitable intermittent driving mechanism which is preferably of the type shown and described in my Patent No. 1,362,807 of December 21, 1921, and which will, therefore, not be hereindescribed. The driving mechanism is so organized that an actuation of the starting lever 70 will cause a crank wheel or disk 71 to make a complete revolution, stopping the crank wheel in its initial position at the end of a revolution.

The crank disk or wheel 71 is connected by means of a pitman or connecting rod 72 to one of the sleeves or lugs 25, or other portion of the spider 24, so that a revolution of the crank wheel 71 causes the spider to move from the position shown in Figs. 1–3 to a position in which the pineapple will be on the sizing tube 18, as shown in Fig. 4.

The mechanism for actuating the conveyor which feeds the fruit into operative relation to the slicing knives includes a pitman 75 also connected at one end with the crank disk 71 and having its other end connected with an arm 76 of a ratchet mechanism. The arm 76 is rigidly connected with an arm 77 having a dog or ratchet 78 pivoted thereon. The dog engages a ratchet wheel or disk 79 having in the construction shown three recesses in which the pawl 78 may engage. The ratchet wheel 79 is rigidly secured to the sprocket wheel 49, whereby the sprocket chain is advanced at each rotation of the crank wheel 71 in such a manner that the fruit which has been sliced is removed from the slicing mechanism and a new fruit is placed into the slicing mechanism.

The swinging of the knife holder or frame 56 about its pivot 58 is effected by means of a connecting rod 80, one end of which is connected to the arm 59 of the knife frame and the other end of which is pivotally connected with a crank 81 arranged on the crank lever disk 82 secured on the end of one of the shafts 83 of the driving mechanism. The mechanism for actuating the knives preferably operates during the last part of the cycle of movement of the machine, while the removing of the cut fruit and placing of an uncut fruit into the slicing mechanism is accomplished in the first part of the cycle.

In order to actuate the coring tube in such a manner that the coring tube will begin to enter the fruit at approximately the same time that the sizing tube begins its operation on the fruit, the following mechanism is preferably employed.

The spider 24 is provided with a rigid, downwardly inclined arm 85, having at its lower end a pivot 86 on which a lever 87 is mounted. This lever is pivotally connected at its lower end with a sleeve 88 having a sliding or lost motion connection with a bar or rod 90 pivoted at 91 on the frame of the machine. The movement of the sleeve 88 on the rod or bar 90 is limited by means of collars 92 and 93, secured to the rod 90. Any other means for securing the lower end of the lever to permit the same to have a certain amount of lost motion may be employed. The upper end of the lever 87 is connected with the coring tube or holder tube in any suitable manner. In the construction shown for this purpose, the lever 87 is provided adjacent to its upper end with pivot pins 95 having pivotal connection with a pair of rods 96, the ends of which are pivotally secured to a sleeve 97 arranged on the outer end of the holding tube 44, the sleeve being mounted on the holding tube in such a manner as to permit the tube to turn relatively to the sleeve. Endwise movement of the sleeve relatively to the holding tube is prevented by means of collars 98. In the operation of this portion of the machine it will be seen that at the initial movement of the spider the fruit will be grasped by the fingers 22, owing to the fact that the weighted levers 32, 32' are released from the cams 36, 36', thus causing the fingers to close upon the fruit. The forward movement of the spider carries the lever 87 with it, causing the sleeve 88 at the lower end thereof to move lengthwise of the rod 90 until the same engages with the collar 93. During this part of the movement of the holding member, the coring tube is not advanced, due to the lost motion connection at the lower end of the lever 87. After the completion of this portion of the movement, the pineapple is brought into engagement with the sizing tube and at the same time the further forward movement of the holder causes the lever 87 to advance the coring tube at a much more rapid rate than the holder itself is advanced. Consequently, the coring operation is started at about the same time that the sizing operation commences so that the coring tube will not tend to push the fruit out of engagement with the fingers of the holding device, but will tend to help press the fruit against the sizing tube. The coring operation will be completed before the sizing operation is finished, so that a positive completion of both of these operations is insured.

Figure 8:
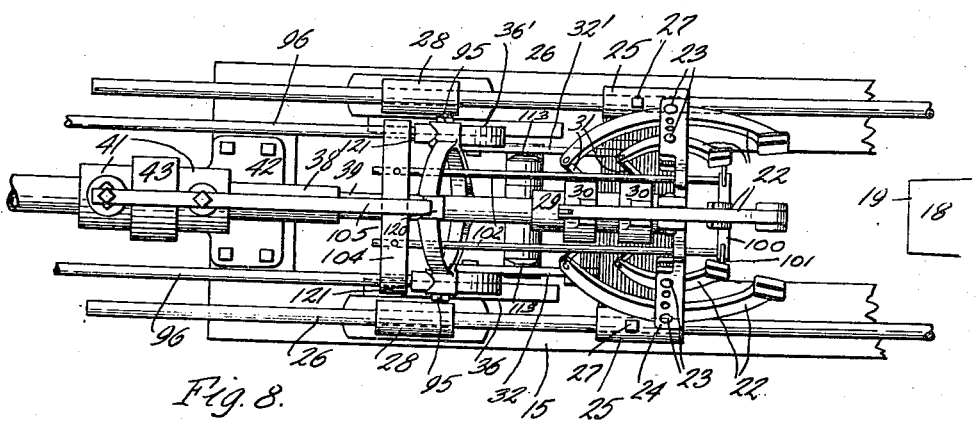
Fig. 8 is a plan view of the portion of the machine shown in Fig. 7.

The machine is also preferably provided with means for ejecting the skins of the fruit and parts adhering thereto after the sizing operation. In the construction shown for this purpose, an annular ejector plate or disk 100 is provided, which in its operative position lies close against the face of the spider 24 and forms a stop against which the end of the fruit to be acted upon may be placed in positioning the fruit in the holder. This plate 100, in the construction shown, is provided with outwardly extending fingers 101, which are adapted to engage the skin of the fruit, and the ejector plate is movable outwardly from its inoperative position to push the skin of the fruit out of engagement with the holding fingers. In the construction shown, the ejecting plate is guided in its movement by means of rods 102 which are slidably arranged on the spider 24, and the rear ends of which are secured to a bridging or connecting member 104 which is also slidably mounted on the rods 96, connecting the coring device with its actuating lever 87. During the advance movement of the holding device, the ejector disk or plate remains in the position shown in Figs. 1 and 2, but on the return movement of the holding member into its initial position the ejector disk is moved outwardly into the position shown in Figs. 7 and 8. This movement of the ejector disk may be effected in any desired manner. In the construction shown for this purpose, the outward movement of the ejector disk 100 is effected by retarding the rearward motion thereof while the holding member continues its rearward motion. For this purpose the bridging or connecting member 104 is adapted to engage a detent or stop member 105, which in the construction shown is mounted on the bearing bracket 42 and is yieldingly held in the position to engage the bridging or connecting member 104 by means of a spring 107. In the construction shown, the detent member 105 is provided with a shoulder 108 adapted to engage the bridging or connecting member, and with a finger or projection 109 which extends beyond the shoulder 108. Since the bridging member is slidably mounted on the rods 96 which engage the coring tube, the ejecting disk 100 will normally move with the holding device, but when the bridging member or connecting member 104 engages the shoulder 108, the ejecting disk will move outwardly to discharge the skin of the fruit.

In order to facilitate the discharge of the skins from the holding member, means are preferably provided for opening the jaws of the holding member before the same reaches its rear position. For this purpose, in the construction shown, a lever 112 is employed, which is also adapted to turn about the axis of the pivot or pin 86 on the end of the arm 85 of the spider, and which has suitable means, such as upwardly extending arms 113 adapted to engage the weighted levers 32, 32'. The lower arm of the lever 112 is provided with a pin or rod 114 adapted to engage a notch or shoulder 115 on a rod or bar 116 pivoted at one end of the frame of the machine, and the other end of which is supported from the pivot pin 86 by means of a link 117. As the holding member moves from its sizing position shown in Fig. 4 to its receiving position shown in Figs. 1 and 2, the pin 114 engages the shoulder 115, thus causing the upper arms 113, to swing from the positions shown in Figs. 1 and 2 to the positions shown in Fig. 7, in which positions the weighted levers 32 and 32' will be raised so as to move the fingers of the holder into releasing positions. Upon further movement of the holder to its receiving position, the pin or rod 114 will be released from engagement with the shoulder 115 of the bar 116, at which time the cams 36, 36' will hold the fingers of the holding member in receiving positions. The releasing of the pin or rod 114 from the shoulder 115 is effected by means of the link 117 which slidably engages a projecting end of the rod 116. The rearward movement of the pivot 86 will cause the link 117 to raise the rod 116 so as to disengage the pin 114 from the shoulder 115.

In order to return the ejecting disk 100 to its initial position, after ejecting the skin of the fruit, the bridging or connecting member 104 is released from engagement with the stop or detent 105 by means of a projection 120 on the extreme upper end of the coring tube actuating lever 87. This projection is adapted to engage the finger 109 of the detent to raise the same sufficiently to release the bridging member 104. Upon further rearward movement of the upper end of the lever 87, a shoulder 121 of the rod 96 engages the bridging member 104 and moves the same, together with the ejecting disk 100 to its rear, inoperative position. Further movement of the holding member then causes the lever 87 to swing about the pivot 86 so that the lower sleeve 88 thereof engages the collar 92, whereupon the machine comes to a standstill and is ready to receive another fruit. Means of other construction for ejecting the fruit may be provided.

By means of the machine described, the several operations of the coring, sizing and slicing, and the ejecting of the skin of the fruit may be accomplished in one operation of the machine, so that the time and labor involved in performing these operations on separate machines is saved. The fruit when being operated upon by this machine need only be handled once, namely in positioning the same in the holder, and upon actuating the starting lever 70 the machine automatically performs the various operations on the fruit.

I claim as my invention:

1. In a machine for operating on fruit, the combination of a sizing tube, a holder for the fruit, a coring tube, and means for moving the holder and coring tube relatively to the sizing tube to effect the coring and sizing of the fruit in one operation.

2. In a machine for operating on fruit, the combination of a sizing tube, a holder for the fruit, a coring tube, and means for moving said parts relatively to each other so that the coring and sizing tubes act simultaneously on the fruit.

3. In a machine for operating on fruit, the combination of a sizing tube and a coring tube, a holder for the fruit, one of said tubes being arranged axially with regard to said holder, means for moving said holder toward and from the other tube, and means for moving said first mentioned tube relatively to said holder and into telescopic relation to said other tube.

4. In a machine for operating on fruit, the combination of a sizing tube and a coring tube, a holder for the fruit, one of said tubes being arranged axially with regard to said holder, means for moving said holder toward and from the other tube, means for moving said first mentioned tube relatively to said holder and into telescopic relation to said other tube, and means for removing the outer portion of the fruit from said holder after the sizing operation.

5. In a machine for operating on fruit, the combination of a sizing tube, a holder for engaging the outer surface of the fruit, a coring tube arranged concentrically in regard to said holder and to said sizing tube, means for moving said holder in a direction to carry the fruit to said sizing tube, and means for moving said coring tube through the axis of said holder and into said sizing tube.

6. In a machine for operating on fruit, the combination of a sizing tube, a holder for the fruit, a coring tube, and means for moving said holder and one of said tubes relatively to the other tube to effect the coring and sizing of the fruit in one operation, and means for removing the outer portion of the fruit from the holder after the sizing operation.

7. In a machine for operating on fruit, the combination of a reciprocatory holder for the fruit including a plurality of fingers adapted to engage the outer portion of the fruit, and means for causing said fingers to grip the fruit when said holder moves out of its initial position and for releasing the fruit when said holder returns to its initial position.

8. A reciprocatory holder for fruit including fruit gripping fingers pivotally mounted about the axis of the holder and adapted to engage the outer surface of the fruit, an axially movable member connected with said fingers for causing the same to be moved into and out of their gripping positions, and means operated by the reciprocation of the holder for guiding the movement of said axially movable member relatively to said holder.

9. A reciprocatory holder for fruit including fruit gripping fingers pivotally mounted about the axis of the holder and adapted to engage the outer surface of the fruit, an axially movable member connected with said fingers for causing the same to be moved into and out of their gripping positions, and means for yieldingly moving said axially movable members into a position to move said fingers into their gripping positions when said holder moves out of its initial position, and into releasing positions when said holder returns to its initial position.

10. A holder for fruit including fruit gripping fingers pivotally mounted about the axis of the holder and adapted to engage the outer surface of the fruit, an axially movable member connected with said fingers for causing the same to be moved into and out of their gripping positions, a weighted lever which normally moves said fingers into their gripping positions, and means for moving said weighted lever into a position for opening said fingers when said holder is in an initial position.

11. In a machine for operating on fruit, the combination of a holder having a plurality of sets of fingers adapted to grip the fruit at different distances from the ends thereof, and means for independently moving each of said sets of fingers into their fruit-engaging positions.

12. In a machine for operating on fruit, the combination of a holder including fingers pivotally mounted and adapted to be moved into positions to engage the fruit, a central tubular member connected with said holder, and a sleeve movably mounted on said tubular member for moving said fingers into and out of gripping positions.

13. In a machine for operating on fruit, the combination of a holder including fingers pivotally mounted and adapted to be moved into positions to engage the fruit, a central tubular member connected with said holder, a sleeve movably mounted on said tubular member for moving said fingers into and out of gripping positions, and a weighted lever connected with said sleeve for yieldingly moving said fingers into their fruit-gripping positions.

14. In a machine for operating on fruit, the combination of a holder including fingers pivotally mounted and adapted to be moved into positions to engage the fruit, a central tubular member connected with said holder, a sleeve movably mounted on said tubular member for moving said fingers into and out of gripping positions, and a coring tube arranged within said tubular member and movable into engagement with the fruit while the same is held in said holder.

15. In a machine for operating on fruit, the combination of a sizing tube, a holder for the fruit, a coring tube, mechanism for slicing the cored and sized fruit after the same leaves said sizing tube, and mechanism for causing the coring, sizing and holding members to operate on one fruit while the slicing member is operating on a previously sized and cored fruit.

16. In a machine for operating on fruit, the combination of a slicing tube, a holder for the fruit, a coring tube, mechanism for slicing the cored and sized fruit after the same leaves said sizing tube, mechanism for causing the coring, sizing and holding members to operate on one fruit while the slicing member is operating on a previously sized and cored fruit, and an intermittently operating conveyor for feeding the sized fruit from the sizing device to the slicing device, said conveyor also being operated by said mechanism.

17. In a machine for operating on fruit, the combination of a holder for the fruit, a sizing member and a coring member, means for timing the operation of the sizing and coring members on the fruit so that the two members start the operations at approximately the same time and so that the coring member completes the coring operation before the sizing member completes the sizing operation, said coring and sizing members starting their operations at opposite ends of the fruit.

18. In a machine for operating on fruit, the combination of a relatively stationary sizing member, a holding member movable toward and from said sizing member, a coring member movable axially with reference to said holding member toward and into said sizing member, and a connection between said holding member and said coring member for causing the coring member to move initially at substantially the same speed as said holding member, and then to advance at a speed greater than said holding member to cause the coring member to pass through the fruit held by said holding member.

19. In a machine for operating on fruit, the combination of a relatively stationary sizing member, a holding member movable toward and from said sizing member, a coring member movable axially with reference to said holding member toward and into said sizing member, a lever pivoted on said holding member and having a lost motion connection at one end with a stationary part of the machine and connected at its upper end with said coring member, whereby the coring member moves substantially with the holding member during the initial movement of the holding member and advances more rapidly than the holding member after said initial movement.

20. In a machine for operating on fruit, the combination of a relatively stationary sizing member, a holding member movable toward and from said sizing member, a coring member movable axially with reference to said holding member toward and into said sizing member, a lever pivoted on said holding member and connected with said coring member, an ejecting member movable into a position to eject the skin of the fruit from said holder, and means actuated by said lever for moving said ejecting member out of its ejecting position.

21. A holder for fruit including gripping fingers adapted to engage the outer portion of the fruit, an ejecting mechanism including a part arranged on said holder and against which the fruit is placed in positioning the same in said holder, and which normally moves with said holder, means for moving the holder into a position in which the fruit is operated upon and back to a starting position, and a detent which engages said ejecting mechanism and prevents the movement thereof to the starting position, whereby said ejecting mechanism expels the outer portion of the fruit from said holder.

22. A holder for fruit including gripping fingers adapted to engage the outer portion of the fruit, an ejecting mechanism including a part arranged on said holder and against which the fruit is placed in positioning the same in said holder and which normally moves with said holder, means for moving the holder into a position in which the fruit is operated upon and back to a starting position, a detent which engages said ejecting mechanism and prevents the movement thereof to the starting position, whereby said ejecting mechanism expels the outer portion of the fruit from said holder, and means operated by the further movement of said holder to its starting position to move said ejecting mechanism to its initial position with reference to said holder.

23. A holder for fruit including gripping fingers adapted to engage the outer portion of the fruit, an ejecting mechanism including a part arranged on said holder and against which the fruit is placed in positioning the same in said holder and which normally moves with said holder, means for moving the holder into a position in which the fruit is operated upon and back to a starting position, a detent which engages said ejecting mechanism and prevents the movement thereof to the starting position, whereby said ejecting mechanism expels the outer portion of the fruit from said holder, a coring tube movable relatively to said holder, and a device for actuating said coring tube and which moves said ejecting mechanism to its initial position with reference to said holder after said ejecting mechanism has expelled the outer portion of the fruit from said holder.

24. A holder for fruit including gripping fingers adapted to engage the outer portion of the fruit, an ejecting mechanism including a part arranged on said holder and against which the fruit is placed in positioning the same in said holder and which normally moves with said holder, means for moving the holder into a position in which the fruit is operated upon and back to a starting position, a detent which engages said ejecting mechanism and prevents the movement thereof to the starting position, whereby said ejecting mechanism expels the outer portion of the fruit from said holder, a coring tube movable relatively to said holder, and a lever pivoted on said holder for actuating said coring tube, said lever having a projection which is adapted to release said detent and move said ejecting mechanism to its initial position with reference to said holder.

25. In a machine for operating on fruit, the combination of means for coring and sizing the fruit, a slicing mechanism including a tubular member provided with a plurality of slits into which the fruit is fed from said coring and sizing means, and a frame having a plurality of knives mounted thereon and adapted to pass through said slits for slicing the fruit.

26. In a machine for operating on fruit, the combination of means for sizing fruit, means for slicing the fruit, including a tubular member provided with a plurality of slits, a conveyor for moving the fruit discharged from said sizing means to said tubular member, and a knife frame having a plurality of knives adapted to enter said slits to slice the fruit.

27. In a machine for operating on fruit, the combination of means for slicing the fruit including means for supporting the fruit while being sliced, and a swinging knife frame for supporting a plurality of knives and including channel shaped portions in which the opposite ends of the knives are secured, and tightening means for each knife for holding said knives taut in said frame.

28. In a machine for operating on fruit, the combination of means for sizing fruit, conveying means to which the fruit passes from said sizing means, and slicing means to which the fruit is passed by said conveying means.

29. In a machine for operating on fruit, the combination of means for sizing fruit, conveying means to which the fruit passes from said sizing means, slicing means to which the fruit is passed by said conveying means, and mechanism for causing said sizing and conveying means to operate alternately.

30. In a machine for operating on fruit, the combination of means for sizing fruit, conveying means to which the fruit passes from said sizing means, slicing means to which the fruit is passed by said conveying means, and mechanism connecting said sizing, conveying and slicing means to cause said several means to operate at proper intervals.

ELGIE J. LEWIS.